United States Patent
Majumdar et al.

(10) Patent No.: US 6,186,202 B1
(45) Date of Patent: Feb. 13, 2001

(54) SILICA REINFORCED SOLVENTLESS ELASTOMERIC ADHESIVE COMPOSITIONS

(75) Inventors: Ramendra Nath Majumdar, Hudson; Lewis Timothy Lukich; Thomas Edwin Duncan, both of Akron; Bruce Raymond Hahn, Hudson, all of OH (US)

(73) Assignee: The Goodyear Tire & Rubber Company, Akron, OH (US)

( * ) Notice: Under 35 U.S.C. 154(b), the term of this patent shall be extended for 0 days.

(21) Appl. No.: 08/603,141

(22) Filed: Feb. 20, 1996

(51) Int. Cl.$^7$ ................................................. B60C 11/00
(52) U.S. Cl. ........................................ 152/209.6; 156/96
(58) Field of Search .................... 156/96; 152/209 R, 152/565, 209.6; 428/492, 494, 495, 517; 524/492, 493

(56) References Cited

U.S. PATENT DOCUMENTS

| | | | |
|---|---|---|---|
| 3,035,954 | * 5/1962 | Jones et al. | 428/495 |
| 3,058,859 | * 10/1962 | Amberg | 428/495 |
| 3,219,091 | * 11/1965 | Iknayan et al. | 428/495 |
| 3,260,641 | * 7/1966 | Falcone | 156/96 |
| 3,335,041 | 8/1967 | Osborne . | |
| 3,342,238 | 9/1967 | Weinstock et al. . | |
| 3,411,970 | * 11/1968 | Perrin | 428/494 |
| 3,421,565 | 1/1969 | Reinbold . | |
| 3,522,831 | 8/1970 | Torti et al. . | |
| 3,768,537 | * 10/1973 | Hess et al. | 524/571 |
| 4,463,120 | 7/1984 | Collins et al. . | |
| 4,518,733 | 5/1985 | Ishikawa et al. . | |
| 4,756,782 | 7/1988 | Seiberling . | |
| 4,803,250 | 2/1989 | Nagasaki et al. . | |
| 4,808,657 | * 2/1989 | Brown | 524/526 |
| 5,063,268 | 11/1991 | Young . | |
| 5,066,721 | * 11/1991 | Hamada et al. | 525/102 |
| 5,162,409 | 11/1992 | Mroczkowski . | |
| 5,226,987 | * 7/1993 | Matsumoto et al. | 152/209 R |
| 5,328,636 | 7/1994 | Maly et al. . | |
| 5,503,940 | 4/1996 | Majumdar et al. . | |

FOREIGN PATENT DOCUMENTS

| | | |
|---|---|---|
| 3333531 A1 | 3/1985 | (DE) . |
| 3618941 A1 | 12/1987 | (DE) . |
| WO 92/07904 | 5/1992 | (EP) . |
| WO 93/09178 | 5/1993 | (EP) . |
| 1235026 | 6/1971 | (GB) . |

OTHER PUBLICATIONS

An article entitled: "The Vulcanizing Mechanism of N,N'–m–phenylene Bismaleimide and the Vulcanizing Properties" from IRC '85 Kyoto: Int'l Rubber conference Proceedings, Kyoto, Japan, Oct. 15–18, 1985, Corporate Edition: Japan Soc. of Rubber Industry, pp. 875–880.

(List continued on next page.)

Primary Examiner—Geoffrey L. Knable
(74) Attorney, Agent, or Firm—H C Young, Jr.

(57) ABSTRACT

A silica reinforced solventless adhesive composition or cushion comprises a blend of rubber, silica, a silica coupling agent, an optional tackifier, and low or nil amounts of carbon black. The elastomeric adhesive composition can be utilized with various other rubber layers to adhere a cured or uncured tire tread to a cured tire casing. The elastomeric adhesive composition has good blowout resistance and a very low, final blowout test temperature.

9 Claims, 1 Drawing Sheet

OTHER PUBLICATIONS

A publication in the Rubber Chemicals Technical Bulletin entitled "Perkalink® 900 Reversion Resistance by Crosslink Compensation" published by Akzo Nobel, 21 pages, Publication 94–110, Aug., 1994.

An article entitled "Reactive Compounds for Effective Utilization of Silica", published in *Rubber Chemistry and Technology*, Swapan Kumar Mandal and Dipak Kumar Basu, Polymer Science Unit, Indian Association for the Cultivation of Science, Jadavpur, Calcutta, India, pp. 672–685, Oct. 18, 1993, Revised Apr. 22, 1994.

European Search Report Application No. EP 97 10 2135 completed May 16, 1997 by the European Patent Office.

Publication No. 05170975, published Jul. 9, 1993 by Patent Abstracts of Japan disclosing the abstract of Japanese Application 03341323 and obtained from the European Patent Office with a European Search Report.

* cited by examiner

SILICA REINFORCED SOLVENTLESS ELASTOMERIC ADHESIVE COMPOSITIONS

FIELD OF THE INVENTION

The present invention relates to elastomeric laminates containing an adhesive composition or cushion layer which has a low, final blowout test temperature. More specifically, the present invention relates to a silica reinforced solventless elastomeric adhesive composition having a sulfur containing alkylene alkoxy silane coupling agent and generally having low or nil amounts of carbon black.

BACKGROUND OF THE INVENTION

Heretofore, adhesive compositions for adhering elastomeric components to one another have generally contained volatile organic compounds (VOC) i.e., solvents, therein. Existing solventless adhesive based polybutadiene/natural rubber compositions compounded with carbon black and other ingredients while having strong adhesive bond strength when utilized as an adhesive cushion are nevertheless unsuitable because of high heat generation during flexing and consequent failure in meeting blowout resistant requirements.

The term "phr" where used herein means "parts per weight of a specified material per 100 parts by weight rubber, or elastomer, in a rubber composition".

SUMMARY OF THE INVENTION

The adhesive composition or cushion layer can be utilized to bond various elastomeric layers together such as a retread layer to a tire casing, or the ends of a tire tread to one another. The adhesive composition is reinforced with silica and has low or nil amounts of carbon black, is solventless, and contains effective amounts of a coupling agent such as a sulfur containing alkylene alkoxy silane to produce a low, final blowout test temperature.

DETAILED DESCRIPTION OF THE INVENTION

Figure 1:
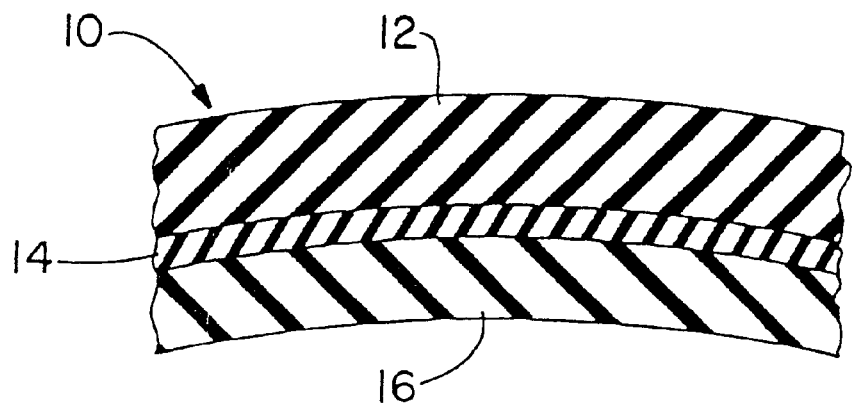
FIG. 1 is a partial cross-sectional side view of a laminate in the form of a retreaded tire in accordance with the present invention.

According to an embodiment of the present invention, a laminate in the form of retreaded tire 10 has a cured or uncured retread layer 12 adhered to a cured tire casing 16 by the solventless elastomeric adhesive composition of the present invention in the form of an adhesive cushion layer 14. The retread layer is adhered directly to the tire casing by the cushion layer in that no additional intervening layers or compounds such as cement, adhesives, bonding layers, and the like are utilized. Retread layer 12 can be made from any retread composition known to the art utilizing various rubbers such as those made from natural rubber, conjugated diene monomers having from 4 to 10 carbon atoms (e.g. polybutadiene, polyisoprene, etc.), rubbers made from conjugated diene monomer(s) having from 4 to 10 carbon atoms copolymerized with a vinyl substituted aromatic monomer (s) having from 8 to 12 carbon atoms (e.g., styrene-butadiene rubber), and the like, as well as blends thereof. Such rubbers generally contain various antioxidants, fillers such as carbon black, oils, sulfur, accelerators, antioxidants, stearic acid, antiozonants and the like in conventional amounts.

The cured tire casing rubber compositions are well known to the art and generally include a variety of synthetic rubbers, natural rubber or blends thereof. Illustrative examples include rubbers made from conjugated diene monomers having from 4 to 10 carbon atoms such as polyisoprene or polybutadiene, rubbers made from conjugated diene(s) having from 4 to 12 carbon atoms copolymerized with a vinyl substituted aromatic material having from 8 to 12 carbon atoms such as, for example, styrene-butadiene rubber, and the like, as well as blends thereof. Such rubbers are generally compounded with oil, fillers such as carbon black, processing aids, zinc oxide, stearic acid, sulfur, accelerators, antioxidants, antiozonants and the like in conventional amounts.

The adhesive cushion layer compositions of the present invention have a built-in or inherent tack and thus are solventless, that is, substantially free of solvent inasmuch as they generally have five parts by weight or less, desirably three, two, or one parts by weight or less, and preferably nil, i.e., completely free, of any volatile organic compounds (VOC), per 100 parts by weight of rubber (phr).

Suitable elastomers which can be used in preparing the solventless elastomeric adhesive cushion composition of the present invention include natural rubber (cis 1,4-polyisoprene) and various synthetic rubbers as well as blends thereof. Examples of suitable synthetic rubbers include copolymers of conjugated diene(s) having from 4 to about 7 carbon atoms with a vinyl substituted aromatic compound having from 8 to about 12 carbon atoms such as, for example, styrene-butadiene rubbers; polymers and copolymers of conjugated dienes having from 4 to 7 carbon atoms, such as synthetic cis-1,4-polyisoprene, polybutadiene, polychloroprene (neoprene rubber); as well as various blends thereof. Especially preferred are blends comprising from about 15 to about 70, and desirably from about 30 to about 50, percent by weight of natural rubber and from about 30 to about 85, and desirably from about 50 to about 70, percent by weight of cis 1,4-polybutadiene based upon the total weight of all rubber therein.

An important aspect of the present invention is the use of silica as a reinforcing agent in an amount of from about 15 or 25 to about 70 or 80, or desirably from about 40 to about 60, parts by weight per 100 parts by weight of rubber (phr). The mean BET surface area of the silica may be generally from about 20 to about 500 $m^2/g$ and preferably from about 60 to about 300 $m^2/g$. Various types of reinforcing silica can be utilized including fumed silica, precipitated silica, hydrated silica, and the like with precipitated silica being preferred.

Another important aspect of the present invention is that reduced amounts of carbon black are utilized as compared to amounts of carbon black reinforcement that may normally otherwise be used, that is, 25 or less, 20 or less, desirably 15 or less, 10 or less, 5 or less, and preferably nil, i.e., no carbon black at all, parts by weight per 100 parts by weight of rubber. If utilized, any conventional elastomer reinforcing carbon black is suitable and the average mean particle diameter thereof is 285 nm or less, and preferably 60 nm or less as in grades N550, N330, and the like (ASTM-D-3849).

Generally any coupling agent can be utilized which effectively bonds (i.e., chemically bonds) the silica reinforcing agent to the rubber. A suitable coupling agent are the various sulfur containing alkylene alkoxy silanes having from 2 to 6 sulfur atoms; and from 1 to 3, usually 2, silicon atoms; and wherein the one or more alkylene groups generally each have from 1 to 6 carbon atoms, desirably from 1 to 4 carbon atoms. The number of alkoxy groups is from 1 to 9, usually 6, when the silane contains 2 silicone atoms, and each alkoxy group has from 1 to 4 carbon atoms with 1 or 2 carbon atoms being preferred. Examples of such silane coupling agents include, for example, bis-(3-trialkoxysilylalkyl) polysulfide, γ-mercaptopropyltrimethoxysilane, and γ-mercaptopropyltriethoxysilane. The amount of the sulfur-containing alkylene alkoxy silane compounds of the present invention is generally from about 0.01 to about 0.2, by weight per part of silica. A preferred coupling agent has the formula

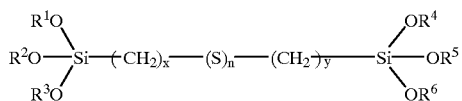

wherein n is from 2 to 6 and preferably about 4, wherein x and y independently are 1 to 4 with 3 being preferred and $R^1$, $R^2$, $R^3$, $R^4$, $R^5$, and $R^6$ independently, is an alkyl having from 1 to 4 carbon atoms with methyl or ethyl being preferred. A specific example of a preferred coupling agent is Si69 as bis-(3-[triethoxysilyl)]-propyl)tetrasulfide from Degussa, and provided as a 50/50 percent blend by weight thereof with of HAF carbon black. The sulfur containing alkylene oxide silane is often mixed with carbon black to improve mixing and ease of handling.

In addition to the rubber component, the silica, the carbon black if any, and the coupling agent, the adhesive compositions of the invention can optionally but preferably include one or more compatible tackifying agents which are utilized in an effective amount to promote good tack (e.g., pressure sensitive tack) with vulcanized elastomeric substrates and also with uncured, vulcanizable elastomeric substrates (i.e. non-vulcanized or at least substantially non-vulcanized). Hence, the adhesive composition can be applied wrinkle free to a buffed casing, etc. The tackifying resins which can be utilized are generally well known to the art and to the literature and generally include rosin and its derivatives and various hydrocarbon resins. The rosin group comprises rosins, modified rosins and their various derivatives such as esters. The hydrocarbon resin group comprises polyterpines, synthetic hydrocarbon resins, and various modified or special resins which are primarily phenolics. Examples of specific rosin tackifiers include gum rosin, wood rosin, tall oil rosin, and the like. Such rosins are generally a mixture of organic acids called rosin acids. Minor components in the rosin resin include rosin esters and anhydrides, unsaponifiable matter, and fatty acids. The rosin acids can be divided into two different groups, abietic acid type and primaric acid type. The various rosin acids can be reacted with a variety of alcohol to form esters. Examples of specific rosin resin tackifiers include glycerine rosin ester, e.g., Floral 85, manufactured by Hercules, Inc.; hydrogenated pentaerythritol ester, e.g., Pentalyn H, manufactured by Hercules, Inc.; hydrogenated glycerine ester, e.g., Staybelite Ester 10, manufactured by Hercules, Inc.; modified tall oil rosin, e.g., Sylvatac RX, manufactured by Sylvachem Corp.; polymerized rosin such as Sylvatac 95, manufactured by Sylvachem Corp., and rosin ester such as Zonester 85, manufactured by Arizona Chemical Co.

Hydrocarbon tackifier resins are low molecular weight polymers derived from crude monomer streams. Steams can be obtained from wood, coal, or petroleum sources. Hydrocarbon resin streams can be classified as containing primarily aromatic, aliphatic, and diene (cyclic olefin) monomers. Polymerization of such streams is generally carried out using a Lewis acid catalyst or by a free-radical process using heat and pressure. The aromatic hydrocarbon resins generally contain aromatic petroleum resins and resins from coal tar, commonly called coumarone-indene resins. The various aliphatic hydrocarbon resins are produced from light, so called carbon-5 petroleum fractions wherein the principal monomers are cis and trans-piperylene. Other hydrocarbon resins include mixed aliphatic-aromatic resins as well as terpene resins.

The above tackifier resins are described in more detail in the Handbook of Pressure-Sensitive Adhesive Technology, edited by Donatas Satas, Van Nostrand Reinhold Company, 1982, Chapter 16, pages 353–369, which is hereby fully incorporated by reference.

Another and preferred type of tackifier are the various phenol-formaldehyde resins. Such resins generally have a number average molecular weight of 2,000 or less. Typically, alkyl phenols are used rather than phenol itself since the alkyl group improves the miscibility of the resin with the rubber. Thus, alkyl groups having from 1 to 15 carbon atoms such as butyl, octyl, and nonyl, have been attached to the phenolic nucleus. The manufacture of phenolic resins generally include the condensation of the alkyl phenol with formaldehyde to produce the phenolic resins. Since the phenol has three reactive positions, it will form insoluble resins when more than one mole of formaldehyde is used per mole of phenol. When low ratios of formaldehyde are used, tackifiers are formed. The existence of phenol-formaldehyde tackifiers are well known to the art and to the literature, e.g., "Resins Used in Rubbers" by Paul O. Powers, Rubber Chemistry and Technology, Vol. 36, pages 1542–1562, (1963), and "Role of Phenolic Tackifiers in Polyisoprene Rubber," by F. L. Mangus and G. R. Hamed, Rubber Chemistry and Technology, vol. 64, pages 65–73 (1991).

The amount of tackifying agent, when utilized, is typically from about 1 to about 30, desirably from about 2 to about 15, and preferably from about 6 to 10 phr.

The present invention relates to sulfur cure systems and include one or more cure accelerators in the adhesive cushion composition. Suitable amounts of sulfur and/or sulfur donor-type compounds generally range from about 1 to about 10 and preferably from about 2 to about 4 phr. The amounts of sulfur vulcanization accelerator generally range from about 0.2 to about 4 and preferably from about 0.5 to about 2.0 phr. Various sulfur accelerators can be used such as aldehyde-amine accelerators, e.g., the reaction product of butyraldehyde and aniline, amines such as hexamethylene tetramine, guanidines such as diphenyl guanidine, thioureas, sulfenamides, and the like. Activators such as zinc oxide, stearic acid, litharge, magnesia and amines can also be used in conventional amounts to attain good crosslinking efficiency, such as in amounts of from about 0.5 to about 15 and preferably from about 1 to about 5 or 10 phr. Various oils such as naphthenic oils are commonly utilized in suitable amounts such as from about 1 to about 30 and desirably from about 4 to about 20 phr.

The solventless adhesive compositions of the invention can also include conventional amounts of various known rubber compounding ingredients such as processing aids, stabilizers, antidegradants, and the like. Suitable antioxidants include hindered phenols, amines, amino phenols, hydroquinones, alkyldiamines, amine condensation products and the like.

The uncured elastomeric adhesive composition of the present invention can be vulcanized by heat or radiation according to any conventional vulcanization process. Typically, the vulcanization is conducted at a temperature ranging from about 100° C. to about 250° C. or preferably from about 120° C. to about 170° C. for a time period ranging from about 1 to about 300 minutes. The casing (also precured tread if used) being retreaded, having been previously been vulcanized, requires no additional vulcanization.

The present invention can be utilized to form a laminated retreaded tire for various types of vehicle tires such as passenger car tires, light and medium truck tires, off the road tires, and preferably is utilized in forming retreaded laminates for aircraft and medium truck tires.

Suitable tire tread compositions can be prepared by using conventional mixing techniques including, e.g., kneading, roller milling, extruder mixing, internal mixing (such as with a Banbury® mixing), etc. The sequence of mixing and temperatures employed are well known to skilled rubber compounders, the objective being the dispersion of fillers, activators, curatives in the polymer without excessive heat buildup.

The adhesive composition or cushion of the present invention in addition to forming retreaded tires, can generally be utilized to form a laminate whenever a good heat resistant, good blowout protection adhesive layer is required to bond two or more elastomeric layers together. The various layers can be uncured or cured, but at least one layer must be cured. The various one or more elastomeric layers can generally be any elastomeric rubber composition such as those set forth with regard to the retreaded tires. However, in addition to the above noted rubbers, the various elastomeric layers can include various conventional rubbers known to the art and literature such as various nitrile rubbers, various rubbers made from monomers of ethylene, propylene, and diene monomers, i.e., EPDM rubber, butyl rubber, neoprene rubber, and the like. Examples of other laminates which can utilize the adhesive cushion layer of the present invention include as an adhesive layer for a tire bead layer or an apex component, for conveyor belts, for lapping rubber layers together, and the like.

Figure 2:
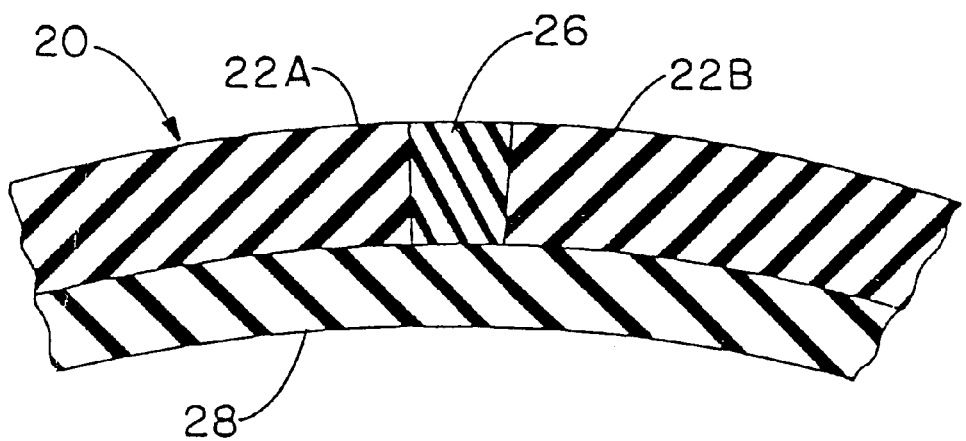
FIG. 2 is a partial cross-sectional side view of a tire tread spliced together using the elastomeric adhesive composition of the present invention.

Another suitable end use is as a tread splice adhesive or joint for adhering the ends of a tire tread to itself since it provides in the uncured stage excellent pressure sensitive building tack as well as excellent adhesion after cure. Thus, as shown in FIG. 2, the spliced tire tread, e.g., uncured or cured, is generally indicated by the numeral 20 and contains two ends of the tire tread 22a and 22b adhered to itself through tire splice material 26 which is the elastomeric adhesive composition of the present invention described herein above. The splice tread portion resides upon a cured tire ply or casing substrate 28. Although not shown, casing substrate 28 can be bonded, adhered, or joined to tire tread 22a or 22b through the use of a conventional adhesive or through the use of the elastomeric cushion adhesive of the present invention as discussed hereinabove and as illustrated in FIG. 1.

The elastomeric adhesive compositions of the present invention have good blowout resistance when utilized as an adhesive tire cushion, as an adhesive tire splice, etc. In this regard, a suitable blowout test consists of subjecting a rubber specimen of suitable size and shape to rapidly oscillating compressive stresses under controlled conditions. The temperature of the sample is measured versus a set time required for fatigue failure of the sample by internal rupture or blowout. The specific blowout test utilized in the examples of the present invention is ASTM D-623.

The following examples serve to illustrate the invention in detail but do not limit the same thereto.

The amounts or parts, are by weight unless otherwise indicated.

EXAMPLE I

Various solventless adhesive compositions were made, the recipes of which are set forth in Table I and presented herein as Exp. A, B and C with Exp. A being a Control.

Table I

| Ingredients | Exp. A (Control) | Exp. B | Exp. C |
|---|---|---|---|
| Polybutadiene Rubber | 60 | 60 | 60 |
| Natural Rubber (NR) | 40 | 40 | 40 |
| Carbon Black | 50 | 0 | 50 |
| Silica | 0 | 50 | 0 |
| Coupling Agent[1] | 0 | 8 | 0 |
| Oil | 6.5 | 6.5 | 6.5 |
| Zinc Oxide | 3.5 | 3.5 | 3.5 |
| Stabilizers (Total) | 2.5 | 2.5 | 2.5 |
| Phenylenediamine Type | 1.5 | 1.5 | 1.5 |
| Octadecanoic Acid | 1.0 | 1.0 | 1.0 |
| Accelerators and Curatives (Total) | 6.4 | 6.4 | 6.4 |
| Sulfenamide | 1.7 | 1.7 | 1.7 |
| Diphenylguanidine | 1.7 | 1.7 | 1.7 |
| Sulfur | 3.0 | 3.0 | 3.0 |
| Phenolic Resin as Tackifier (reaction of formaldehyde with nonyl phenol) | 8 | 8 | 8 |
| Bis - imide[2] | | | 1.5 |

[1]Si69 blended 50/50 with HAF carbon black and manufactured by Degussa; and
[2]N,N'-m-xylylene bis-citraconic imide (Perkalink® 900 manufactured by Akzo).

All three samples were prepared by mixing the ingredients listed in table I in a Banbury® mixer. After the samples were mixed, they were passed through a two-roll mill and subsequently calendered into 40 mil sheets at approximately 82° C.

Laboratory test blocks were then prepared for blowout tests and the results thereof are set forth in Table II. In Table II, the natural rubber control, i.e., Exp. D, contained 100 parts by weight of natural rubber and 50 parts by weight of carbon black per 100 parts by weight of the natural rubber.

TABLE II

Goodrich Blowout Tests of Cushions

| MATERIAL | Exp A (Ctrl) | Exp B | Exp C | Exp D (Ctrl) |
|---|---|---|---|---|
| Blowout Time (Minutes) | 10.5 | 40–45 | >60 | 18 |
| Blowout Temperature (° C.) | 218 | 139 | 171 | 147 |

As apparent from Table II, the natural rubber control (Exp D—commercial control) had a blowout time of 18 minutes. The solventless Exp A Control failed the blowout specification as the blowout time is less than the natural rubber control Exp D. The silica reinforced adhesion cushion composition (Exp B) of the present invention utilizing coupled silica had a good blowout times of 40–45 minutes whereas the formulation utilizing a bis-imide (Exp C composition) had a blowout time of over 60 minutes. The laboratory control composition, Exp A, had a very high and undesirable blowout temperature of 218° C. The bis-imide formulation (Exp C) also has a high blowout temperature of 171° C. However, the silica reinforced formulation (Exp B) of the present invention utilizing coupling agents had a very desirable low, final blowout temperature of 139° C. which is even lower than that of natural rubber control Exp D.

Thus, the present invention using a silica reinforced formulation, i.e., Exp B, resulted in a longer blowout time than the natural rubber control Exp D, and had a very low blowout temperature. The same also resulted in very low heat buildup which is highly desirable with respect to adhesive bond strength inasmuch as the same is reduced with increasing temperatures.

In an adhesion test, the buffed side of a cured casing sheet was wiped with solvent to remove powdered deposits and then dried. A cushion was applied to the casing. To the cushion was applied a 3×6 inch (7.6>15 cm) Mylar separation sheet, followed by a 6×6×0.15 inch (15×15×0.38 cm) uncured tread. The sample was cured for 60 minutes at 150° C. and at 100 psi (6.9 kPa) pressure in a bladder cure press. Strips of 1×6 inch were then cut and pulled apart parallel to the grain of the fabric at room temperature using an Instron tester at a cross-head speed of 2 inches (5.1 cm) per minute. The results are listed below in Table III.

TABLE III

Cured Bond Strength Where Adhesive Cushion was First Sandwiched Between Cured Buffed Carcass Compound and Uncured Tread

| Cushion | Bond Strength lb/in (kN/m) | Tear Type |
| --- | --- | --- |
| 100 Natural rubber (Exp D) | 214 (37.5) | Knotty |
| PBd/NR/Silane/ Coupling Agent (Invention) (Exp B) | 281 (49.2) | Knotty |

As apparent from Table III, the bond strength of the coupled silica-reinforced silica formulation Exp B of the present invention was much greater than the natural rubber control Exp D.

While in accordance with the Patent Statutes, the best mode and preferred embodiment has been set forth, the scope of the invention is not limited thereto, but rather by the scope of the attached claims.

What is claimed is:

1. A retreaded tire assembly, comprising: a circular laminate including a cured casing having an outer peripheral surface;

a circular, uncured, solvent free adhesive cushion layer having an inner and outer peripheral surface, said inner peripheral surface of said cushion layer being directly adhered to said outer peripheral surface of said cured casing without intervening layers of cement or adhesives, said adhesive cushion layer consisting essentially of a blend of at least one rubber, sulfur, a tackifying agent, from about 40 to about 60 phr of silica, less than 20 phr by weight of carbon black, and a silica coupling agent, said adhesive cushion layer rubber being natural rubber, a polymer or copolymer derived from at least one conjugated diene having from 4 to about 7 carbon atoms, a copolymer made from a conjugated diene having from 4 to about 7 carbon atoms and a vinyl substituted aromatic having from 8 to 12 carbon atoms, or blends thereof, said silica coupling agent having the formula

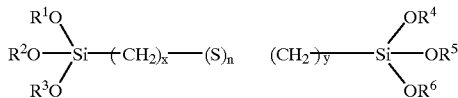

wherein n is from 2 to 6, wherein x and y independently is from 1 to 4, and $R^1$ through $R^6$ independently is an alkyl having from 1 to 4 carbon atoms, and a retread layer having an inner surface adhered to said outer peripheral surface of said cushion layer, the rubber component of said retread layer consisting of natural rubber, a rubber derived from a conjugated diene having from 4 to 10 carbon atoms, or a rubber derived from a conjugated diene having from 4 to 10 carbon atoms and a vinyl substituted aromatic monomer having from 8 to 12 carbon atoms, or blends thereof.

2. A retreaded tire assembly according to claim 1, wherein the amount of said tackifier is from about 1 to about 30 parts by weight phr, and wherein the mean surface area (BET) of said silica is from about 60 to about 300 $m^2/g$.

3. A retreaded tire assembly according to claim 2, wherein said n is about 4, wherein said x and y is 3, wherein said $R^1$ through $R^6$ independently is methyl or ethyl, wherein the amount of said silica coupling agent is from about 0.01 to about 0.2 parts by weight per part by weight of silica, wherein said cushion layer rubber is a blend of from about 15 to 70 percent by weight of natural rubber and from about 30 to about 85 percent by weight of polybutadiene.

4. A retreaded tire assembly according to claim 3, wherein said adhesive cushion layer contains 10 parts by weight or less of carbon black per one hundred parts by weight rubber.

5. A retread layer and a cured tire casing, comprising:

a first elastomeric layer, the rubber component of said first elastomeric layer consisting of natural rubber, a rubber derived from a conjugated diene having from 4 to 10 carbon atoms, or a rubber derived from a conjugated diene having 4 to 10 carbon atoms and a vinyl substituted aromatic monomer having from 8 to 12 carbon atoms, or blends thereof;

a second elastomeric layer, said second elastomeric layer being cured, and an uncured adhesive cushion layer adhering said first elastomeric layer to said second elastomeric layer, said adhesive cushion layer being an uncured composition in direct contact with said cured second elastomeric layer without intervening layers of cement or adhesive, said adhesive cushion layer consisting essentially of a rubber, a tackifying agent, from about 40 to about 60 phr of silica, 20 parts by weight or less of carbon black per one hundred parts by eight rubber, and a silica coupling agent, said adhesive cushion layer rubber being natural rubber, a polymer or copolymer derived from at least one conjugated diene having from 4 to about 7 carbon atoms, or a copolymer derived from a conjugated diene having from 4 to about 7 carbon atoms and a vinyl substituted aromatic having from 8 to 12 carbon atoms, or blends thereof, said silica coupling agent having the formula

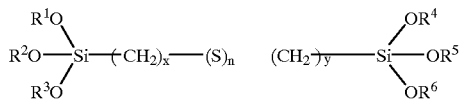

wherein n is from 2 to 6, wherein x and y independently is from 1 to 4, and $R^1$ through $R^6$ independently is an alkyl having from 1 to 4 carbon atoms, wherein said first and second elastomeric layers comprise a retread layer and a cured tire casing and wherein said adhesive cushion layer is substantially free of any volatile organic compound.

6. A retread layer and a cured tire casing according to claim 5, wherein the amount of said silica coupling agent is from about 0.01 to about 0.2 parts by weight per part by weight of silica.

7. A retread layer and a cured tire casing according to claim 6, including from about 1 to about 30 parts by weight phr of a tackifier, wherein the mean BET surface area of said silica is from about 60 to about 300 $m^2/g$, and wherein said cushion layer rubber is a blend of from about 15 to 70 percent by weight of natural rubber and from about 30 to about 85 percent by weight of polybutadiene.

8. A retread layer and a cured tire casing according to claim 6, wherein said n is about 4, wherein said x and y is 3, and wherein said $R^1$ through $R^6$ independently is methyl or ethyl.

9. A retread layer and a cured tire casing according to claim 8, wherein said adhesive cushion layer contains 10 parts by weight or less of carbon black per one hundred parts by weight rubber.

* * * * *